(12) United States Patent
Mio et al.

(10) Patent No.: US 10,076,855 B2
(45) Date of Patent: *Sep. 18, 2018

(54) APPARATUS AND METHOD FOR MANUFACTURING AN ELECTRICITY STORAGE MATERIAL

(71) Applicant: JTEKT Corporation, Osaka-shi (JP)

(72) Inventors: Takumi Mio, Kariya (JP); Takafumi Fujii, Okazaki (JP); Yoshifumi Fukaya, Obu (JP)

(73) Assignee: JTEKT CORPORATION, Osaka-shi (JP)

( * ) Notice: Subject to any disclaimer, the term of this patent is extended or adjusted under 35 U.S.C. 154(b) by 525 days.

This patent is subject to a terminal disclaimer.

(21) Appl. No.: 14/731,897

(22) Filed: Jun. 5, 2015

(65) Prior Publication Data
US 2015/0360392 A1    Dec. 17, 2015

(30) Foreign Application Priority Data

Jun. 13, 2014 (JP) .................................. 2014-122680

(51) Int. Cl.
*H01M 4/04* (2006.01)
*B29B 7/88* (2006.01)
(Continued)

(52) U.S. Cl.
CPC ................ *B29B 7/88* (2013.01); *H01M 4/04* (2013.01); *H01M 4/139* (2013.01); *H01M 4/622* (2013.01);
(Continued)

(58) Field of Classification Search
USPC ................................................ 366/76.1, 69
See application file for complete search history.

(56) References Cited

U.S. PATENT DOCUMENTS 5,856,378 A * 1/1999 Ring .................. C08J 3/203
                                                    428/407
9,531,007 B2 * 12/2016 Mio ...................... H01M 4/04
(Continued)

FOREIGN PATENT DOCUMENTS

JP    2003-77466    3/2003
JP    2011-34962 A  2/2011
(Continued)

OTHER PUBLICATIONS

U.S. Appl. No. 14/851,264, filed Sep. 11, 2015, Mio, et al.
(Continued)

*Primary Examiner* — Mark Halpern
(74) *Attorney, Agent, or Firm* — Oblon, McClelland, Maier & Neustadt, L.L.P.

(57) ABSTRACT

An apparatus and a method for manufacturing an electricity storage material are provided which can avoid defective coating of the electricity storage material. An apparatus for manufacturing an electricity storage material includes: a dissolving device that dissolves a thickener in a solvent; a viscosity adjusting device that adjusts viscosity of a solution produced by the dissolving device; a first filtering device that filters the solution having the viscosity adjusted by the viscosity adjusting device; and a kneading device that kneads the solution filtered by the first filtering device and an active material. Since the apparatus can remove almost all microgels of the thickener by the first filtering device, defective coating can be prevented in the coating of the electricity storage material, and satisfactory electrodes can be manufactured.

10 Claims, 8 Drawing Sheets

(51) Int. Cl.
*H01M 4/139* (2010.01)
*H01M 10/0525* (2010.01)
*H01M 4/62* (2006.01)

(52) U.S. Cl.
CPC .... *H01M 10/0525* (2013.01); *H01M 2220/20* (2013.01)

(56) References Cited

U.S. PATENT DOCUMENTS

| | | | | |
|---|---|---|---|---|
| 2011/0052984 A1* | 3/2011 | Nakamura | .......... | H01M 4/0404 429/213 |
| 2011/0305648 A1* | 12/2011 | Knapek | .................... | A61K 8/42 424/56 |
| 2012/0187347 A1* | 7/2012 | Eilertsen | ................ | H01G 11/38 252/511 |
| 2014/0056095 A1* | 2/2014 | Mio | ...................... | H01M 4/139 366/69 |
| 2014/0225043 A1 | 8/2014 | Mio et al. | | |
| 2015/0199808 A1* | 7/2015 | Nishi | ................... | G01N 15/088 348/86 |
| 2015/0200396 A1* | 7/2015 | Mio | ...................... | H01M 4/139 252/506 |
| 2015/0239151 A1* | 8/2015 | Fujii | ........................ | B29B 7/38 366/83 |
| 2015/0243963 A1* | 8/2015 | Mio | ...................... | H01M 4/043 366/69 |
| 2016/0075052 A1* | 3/2016 | Mio | ...................... | H01M 4/139 366/69 |

FOREIGN PATENT DOCUMENTS

| | | |
|---|---|---|
| JP | 2011-253678 A | 12/2011 |
| JP | 2012-87039 | 5/2012 |
| JP | 2013-146644 | 8/2013 |
| JP | 2014-32775 A | 2/2014 |
| WO | WO 2012/046305 A1 | 4/2012 |

OTHER PUBLICATIONS

Office Action dated Jan. 23, 2018 in Japanese Patent Application No. 2014-122680 (with unedited computer generated English translation from the Global Dossier), 8 pages.

* cited by examiner

PARTICLE SIZE OF MICROGELS
OF THICKENER

FIG. 7B

PARTICLE SIZE OF POWDER
OF ACTIVE MATERIAL

FIG. 8

FIG. 9

APPARATUS AND METHOD FOR MANUFACTURING AN ELECTRICITY STORAGE MATERIAL

INCORPORATION BY REFERENCE

The disclosure of Japanese Patent Application No. 2014-122680 filed on Jun. 13, 2014 including the specification, drawings and abstract, is incorporated herein by reference in its entirety.

BACKGROUND OF THE INVENTION

1. Field of the Invention

The invention relates to an apparatus and a method for manufacturing an electricity storage material.

2. Description of the Related Art

In recent years, lithium ion secondary batteries have been used for hybrid vehicles, electric vehicles, etc. Electrodes of the lithium ion secondary batteries are manufactured by first kneading powder of an active material etc. and a solution of a thickener to produce slurry of an active material (electricity storage material), and then applying the slurry to a base material such as aluminum foil and drying the slurry. This slurry may contain aggregates due to defective dispersion of the powder of the active material etc., metal foreign matter, dust, etc. In this case, a coating jig (slit die) tends to be clogged with the aggregates of the powder of the active material etc. during coating (application) of the slurry. This may cause streaks or crater-like spots in the coating, resulting in defective electrodes.

In order to prevent manufacturing of such defective electrodes, it is necessary to remove the aggregates of the powder of the active material etc. from the slurry of the active material. For example, Japanese Patent Application Publication No. 2013-146644 (JP 2013-146644 A) describes filtration of slurry of an active material with a filter. Japanese Patent Application Publication No. 2012-87039 (JP 2012-87039 A) describes filtration of slurry of an active material with a filtering device. Japanese Patent Application Publication No. 2003-77466 (JP 2003-77466 A) describes filtration of slurry of an active material with addition of alcohol.

In recent years, further improvement in battery performance has been desired. For improved battery performance, the inventors have proposed to perform step-by-step the step of dissolving a thickener, the step of adjusting viscosity of the solution of the thickener, and the step of kneading the solution of the thickener having the adjusted viscosity and powder of an active material etc. However, an undissolved material (microgels) of the thickener may remain as coarse particles in the solution of the thickener. In this case, a coating jig (slit die) tends to be clogged with the microgels as coarse particles of the thickener during coating (application) of slurry. This may cause streaks or crater-like spots in the coating, resulting in defective electrodes.

As described in JP 2013-146644 A, JP 2012-87039 A, and JP 2003-77466 A, a method to prevent manufacturing of such defective electrodes is to remove the microgels as coarse particles of the thickener together with the aggregates of the powder of the active material etc. when filtering the slurry of the active material. However, since the particle size of the microgels as coarse particles of the thickener is typically smaller than that of the aggregates of the powder of the active material etc., the non-aggregated powder of the active material etc. is also removed when the microgels as coarse particles of the thickener are removed. This reduces yield of the slurry of the active material.

SUMMARY OF THE INVENTION

The invention was developed in view of the above circumstances, and it is one object of the invention to provide an apparatus and a method for manufacturing an electricity storage material, which can avoid manufacturing of defective electrodes due to defective coating (application) of the electricity storage material.

According to an aspect of the invention, an apparatus for manufacturing an electricity storage material includes: a dissolving device that dissolves a thickener in a solvent; a viscosity adjusting device that adjusts viscosity of a solution produced by dissolving the thickener in the solvent by the dissolving device; a first filtering device that filters the solution having the viscosity adjusted by the viscosity adjusting device; and a kneading device that kneads the solution filtered by the first filtering device and an active material. The apparatus manufactures an electricity storage material containing at least the thickener and the active material. Since almost all microgels as coarse particles of the thickener can thus be removed by the first filtering device, defective coating can be prevented in coating of the electricity storage material, and satisfactory electrodes can be manufactured.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An apparatus for manufacturing an electricity storage material according to an embodiment of the invention forms, e.g., an apparatus for manufacturing electrodes (positive and negative electrodes) of lithium ion secondary batteries. Electrodes of lithium ion secondary batteries are manufactured by applying slurry of an active material as an electricity storage material to a base material such as aluminum foil or copper foil and drying the slurry. The apparatus for manufacturing an electricity storage material according to the present embodiment is an apparatus for manufacturing slurry of an active material.

For positive electrodes, specific examples of the active material include lithium-nickel oxide etc. as an active material (solid component), N-methylpyrrolidone etc. as a solvent (liquid component), acetylene black etc. as a conductive agent, and polyvinylidene fluoride etc. as a binder. For negative electrodes, specific examples of the active material include graphite etc. as an active material (solid component), water as a solvent (liquid component), carboxymethyl cellulose etc. as a thickener, and SRB rubber, polyacrylic acid, etc. as a binder.

Figure 1:
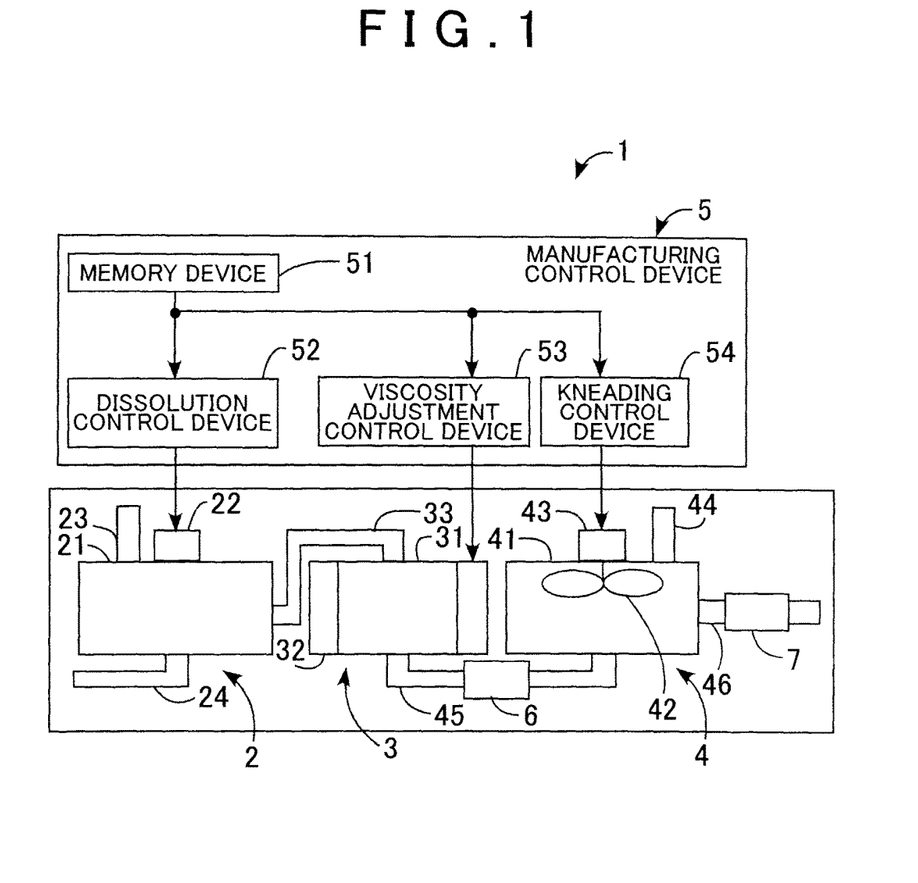
FIG. 1 is a schematic configuration diagram of an apparatus for manufacturing an electricity storage material according to an embodiment of the invention.

The apparatus for manufacturing an electricity storage material according to the present embodiment will be described with reference to FIG. 1. An apparatus 1 for manufacturing an electricity storage material includes a dissolving device 2, a viscosity adjusting device 3, a kneading device 4, a manufacturing control device 5, a first filtering device 6, a second filtering device 7, etc.

The dissolving device 2 is a device that dissolves a thickener in a solvent to produce a solution. The dissolving device 2 includes a housing 21, a microwave device 22, a hopper 23, a supply pipe 24, etc. The housing 21 is formed in a hollow cylindrical shape. The microwave device 22 includes a magnetron, and is placed on the upper surface of the housing 21. The hopper 23 contains the thickener, and is provided so as to project from the upper surface of the housing 21 so that the thickener can be supplied into the housing 21. The supply pipe 24 is connected to the lower surface of the housing 21 so that the solvent can be supplied into the housing 21.

The viscosity adjusting device 3 is a device that adjusts viscosity of the solution produced by the dissolving device 2. The viscosity adjusting device 3 includes a housing 31, an ultrasonic device 32, an inlet pipe 33, etc. The housing 31 is formed in a hollow cylindrical shape. The ultrasonic device 32 is placed on the outer periphery of the housing 31 such that an ultrasonic wave generating element such as a piezoelectric element is in close contact with and is fixed to the outer peripheral surface of the housing 31. The inlet pipe 33 is placed between the outer peripheral wall of the housing 21 of the dissolving device 2 and the upper surface of the housing 31 so that the solution of the thickener contained in the housing 21 of the dissolving device 2 can be introduced into the housing 31.

Figure 7A:
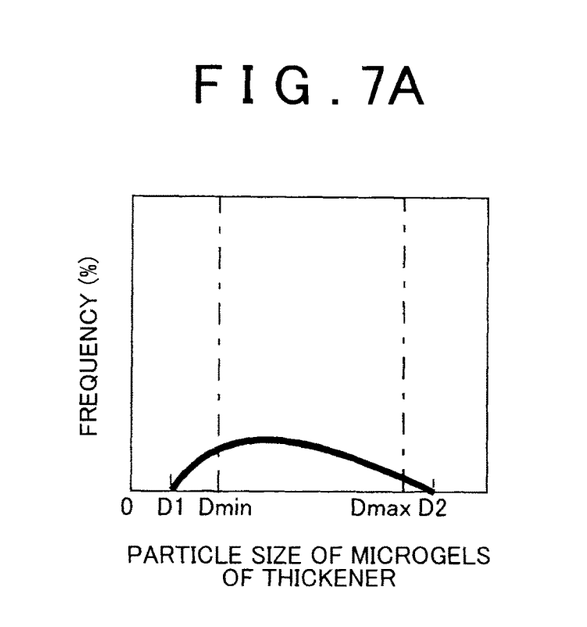
FIG. 7A is a diagram showing the frequency of the particle sizes of microgels in the solution of the thickener.

The first filtering device 6 is a device that filters the solution of the thickener having the adjusted viscosity. The first filtering device 6 is provided at an intermediate position in an inlet pipe 45 connecting the viscosity adjusting device 3 and the kneading device 4. The inlet pipe 45 will be described in detail later. The first filtering device 6 includes a filter 61. The opening of the filter 61, namely the size of mesh openings of the filter 61, is equal to a known minimum particle size of powder of an active material. If the particle size of a material A is equal to or smaller than the value of the opening of the filter 61, the material A passes through the filter 61. If the particle size of a material B is larger than the value of the opening of the filter 61, the material B does not pass through the filter 61. As shown in FIG. 7A, the frequency of the particle sizes of microgels in the solution of the thickener typically has a distribution similar to a normal distribution in the range from a diameter D1 slightly smaller than the minimum particle size Dmin of the powder of the active material to a diameter D2 larger than the known maximum particle size Dmax of the powder of the active material.

The first filtering device 6 therefore can remove those microgels in the solution of the thickener which are larger than the minimum particle size Dmin of the powder of the active material. That is, the first filtering device 6 can remove almost all the microgels in the solution of the thickener. The filter 61 that can be used in the first filtering device 6 is desirably a depth filter. The depth filter is formed of nonwoven fabric of fine fibers bonded with a resin or by thermal fusion and compressed into a flat sheet.

The kneading device 4 is a device that kneads the solution of the thickener having the adjusted viscosity and the powder of the active material etc. The kneading device 4 includes a housing 41, stirring blades 42, a drive motor 43, a hopper 44, the inlet pipe 45, a drain pipe 46, etc. The housing 41 is formed in a hollow cylindrical shape. A rotary shaft for the stirring blades 42 is placed and supported on the central portion of the upper surface of the housing 41 so that the stirring blades 42 can rotate in the housing 41. The drive motor 43 is fixed to the upper surface of the housing 41, and a motor shaft of the drive motor 43 is coupled to the rotary shaft for the stirring blades 42.

The hopper 44 contains the powder of the active material etc., and is provided so as to project from the upper surface of the housing 41 so that the powder of the active material etc. can be supplied into the housing 41. The inlet pipe 45 is placed between the lower surface of the housing 31 of the viscosity adjusting device 3 and the lower surface of the housing 41 so that the solution of the thickener contained in the housing 31 of the viscosity adjusting device 3 can be introduced into the housing 41. The drain pipe 46 is connected to the outer peripheral surface of the housing 41 so that slurry of an active material can be drained from the housing 41.

Figure 7B:
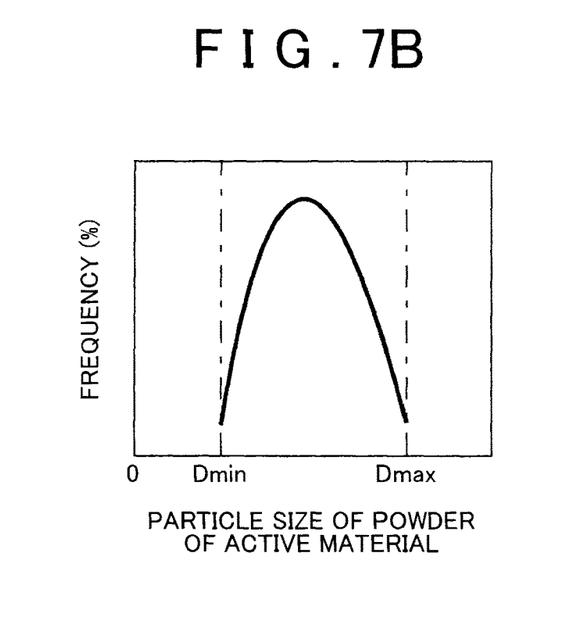
FIG. 7B is a diagram showing the frequency of the particle sizes of powder of an active material.

The second filtering device 7 is a device that filters the slurry (corresponding to the "kneaded mixture" of the invention) produced by kneading the solution of the thickener and the powder of the active material etc. The second filtering device 7 is provided at an intermediate position in the drain pipe 46. The second filtering device 7 includes a filter 71. The opening of the filter 71 is equal to the maximum particle size of the powder of the active material. As shown in FIG. 7B, the frequency of the particle sizes of the non-aggregated powder of the active material typically has a normal distribution in the range from the minimum particle size Dmin of the powder of the active material to the maximum particle size Dmax of the powder of the active material. Aggregates of the powder of the active material, metal foreign matter, dust, etc. have outer diameters larger than Dmax. The second filtering device 7 therefore can remove substantially all of the aggregates of the powder of the active material, the metal foreign matter, dust, etc. The filter 71 that can be used in the second filtering device 7 is desirably a depth filter, as in the case of the filter 61 of the first filtering device 7.

The manufacturing control device 5 includes a memory device 51, a dissolution control device 52, a viscosity adjustment control device 53, a kneading control device 54, etc. The memory device 51 stores data showing the relationship between the viscosity of the solution of the thickener and the dissolution rate to solubility of the solution of the thickener (see FIG. 3), data showing the relationship between the viscosity of the slurry of the active material and the viscosity of the solution of the thickener (see FIG. 5), data showing the relationship between the viscosity of the solution of the thickener and the solution viscosity adjustment time (see FIG. 6), and other data relating to dissolution control, viscosity adjustment, kneading control, etc. As used herein, the "dissolution rate to solubility" refers to the rate of the mass of solute dissolved in a certain amount of solvent to solubility (the maximum mass of solute that can be dissolved in the solvent).

The dissolution control device 52 is a control device that controls operation of the dissolving device 2. The dissolution control device 52 produces the solution of the thickener by driving the microwave device 22 to generate microwaves and applying the microwaves to the solvent supplied into the housing 21 to dissolve the thickener in the solvent. The viscosity adjustment control device 53 is a control device that controls operation of the viscosity adjusting device 3. The viscosity adjustment control device 53 adjusts the viscosity of the solution of the thickener by driving the ultrasonic device 32 to generate ultrasonic waves and applying the ultrasonic waves to the solution of the thickener supplied into the housing 31. That is, the viscosity adjustment control device 53 decides the viscosity of the solution of the thickener based on the final viscosity of the slurry of the active material, and controls viscosity adjustment by applying the ultrasonic waves for a predetermined time so that the solution of the thickener has the decided viscosity.

The kneading control device 54 is a control device that controls operation of the kneading device 4. The kneading control device 54 produces the slurry of the active material by driving the drive motor 43 to rotate the stirring blades 42 and thus stirring the solution of the thickener and the active material etc. which have been supplied into the housing 41. As described in detail below, the kneading control device 54 sets a kneading index based on kinetic energy of particles of the active material, the mean free path of the particles of the active material, and a kneading time for the active material. The kneading control device 54 sets kneading conditions so that the set kneading index is equal to or lower than a target value, and controls kneading of the active material according to the set kneading conditions.

Processing that is performed by the manufacturing control device 5 will be described below with reference to FIGS. 2A and 2B. The manufacturing control device 5 reads data relating to dissolution of the thickener (step S1 in FIG. 2A), and introduces the thickener and the solvent into the dissolving device 2 (step S2 in FIG. 2A). The manufacturing control device 5 drives the dissolving device 2 (step S3 in FIG. 2A) and determines if a predetermined dissolution time has passed (step S4 in FIG. 2A). The manufacturing control device 5 stops driving the dissolving device 2 if the predetermined dissolution time has passed (step S5 in FIG. 2A).

Specifically, the dissolution control device 52 reads from the memory device 51 data on the mass of the thickener and the mass of the solvent and data on the dissolution time. The dissolution control device 52 introduces a predetermined amount of thickener into the housing 21 through the hopper 23, and introduces a predetermined amount of solvent into the housing 21 through the supply pipe 24. The dissolution control device 52 drives the microwave device 22 to apply microwaves to the solvent in the housing 21 to dissolve the thickener therein. The dissolution control device 52 stops driving the microwave device 22 if a predetermined dissolution time has passed.

Figure 3:
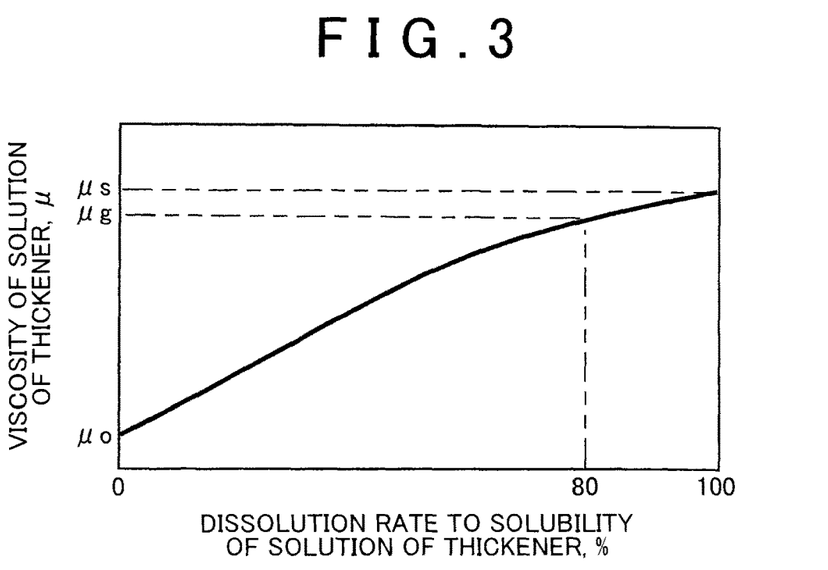
FIG. 3 is a diagram showing the relationship between the viscosity of a solution of a thickener and the dissolution rate to solubility of the solution of the thickener.

Dissolution of the thickener in the solvent will be described. As shown in FIG. 3, "µo" represents the viscosity of the solution of the thickener immediately after the thickener is added to the solvent, i.e., at the time the thickener has not been dissolved in the solvent. Namely, "µo" represents the viscosity of the solution of the thickener at the time the dissolution rate to solubility is 0%. If dissolution of the thickener proceeds and the dissolution rate to solubility increases to 80%, the viscosity µ of the solution of the thickener increases to µg (>µo). If the thickener has been dissolved in the solvent to saturation, that is, if the dissolution rate to solubility increases to 100%, the viscosity µ of the solution of the thickener increases to µs (>µg). The viscosity of the solution of the thickener can therefore be estimated based on the dissolution rate to solubility of the solution of the thickener. Accordingly, it can be determined if the thickener has been satisfactorily dissolved in the solution.

Figure 4:
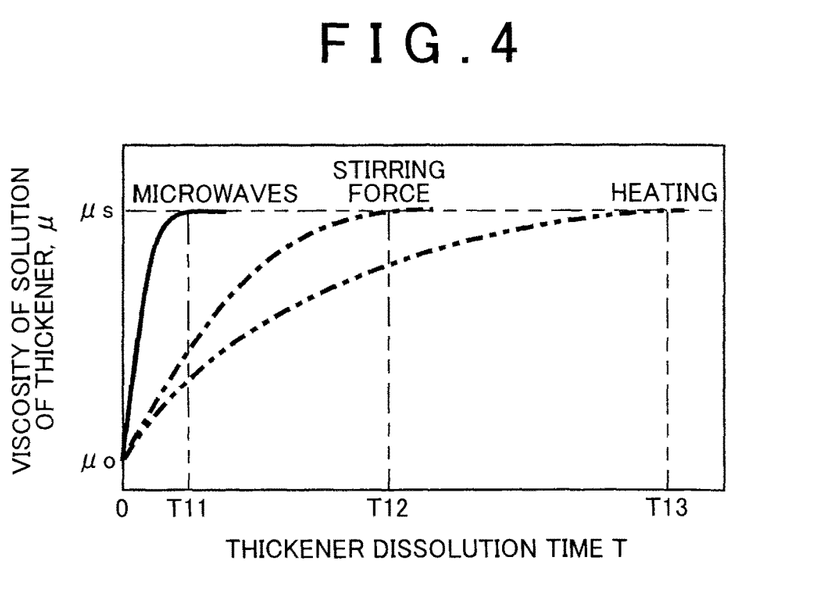
FIG. 4 is a diagram showing respective changes in viscosity of the solution of the thickener with time in the case of dissolving the thickener by using microwaves, a stirring force, and heating.

The thickener may be dissolved in the solvent by stirring as in conventional examples. In the present embodiment, however, the thickener is dissolved in the solvent by vibrating solvent molecules by microwaves. This is because the thickener can be more efficiently dissolved in the solvent by the dissolving method using microwave vibrations than by a dissolving method using a stirring force or a dissolving method using heating of the solvent, as shown in FIG. 4. That is, the time required to adjust the viscosity µ of the solution of the thickener to the viscosity µs, namely to the viscosity at the time the thickener has been dissolved in the solvent to saturation, (the thickener dissolution time T) is T12 in the case of using a stirring force, and T13 (>T12) in the case of heating the solvent. However, the use of microwaves can reduce the thickener dissolution time T to T11 (<T12<T13). The dissolution using microwaves therefore requires less electric power than the dissolution using a stirring force.

Based on the above, the thickener dissolution time T can be set to at least T11 in the case of using microwaves. Dissolution using microwaves is performed by vibrating solvent molecules by microwave radiation and thus causing the solvent to penetrate the thickener. A desirable frequency band of the microwaves is a frequency band in which the solvent tends to absorb energy of the microwaves. For example, a frequency band from 0.9 GHz to 400 GHz is used in the case of using water as the solvent.

Figure 2A:
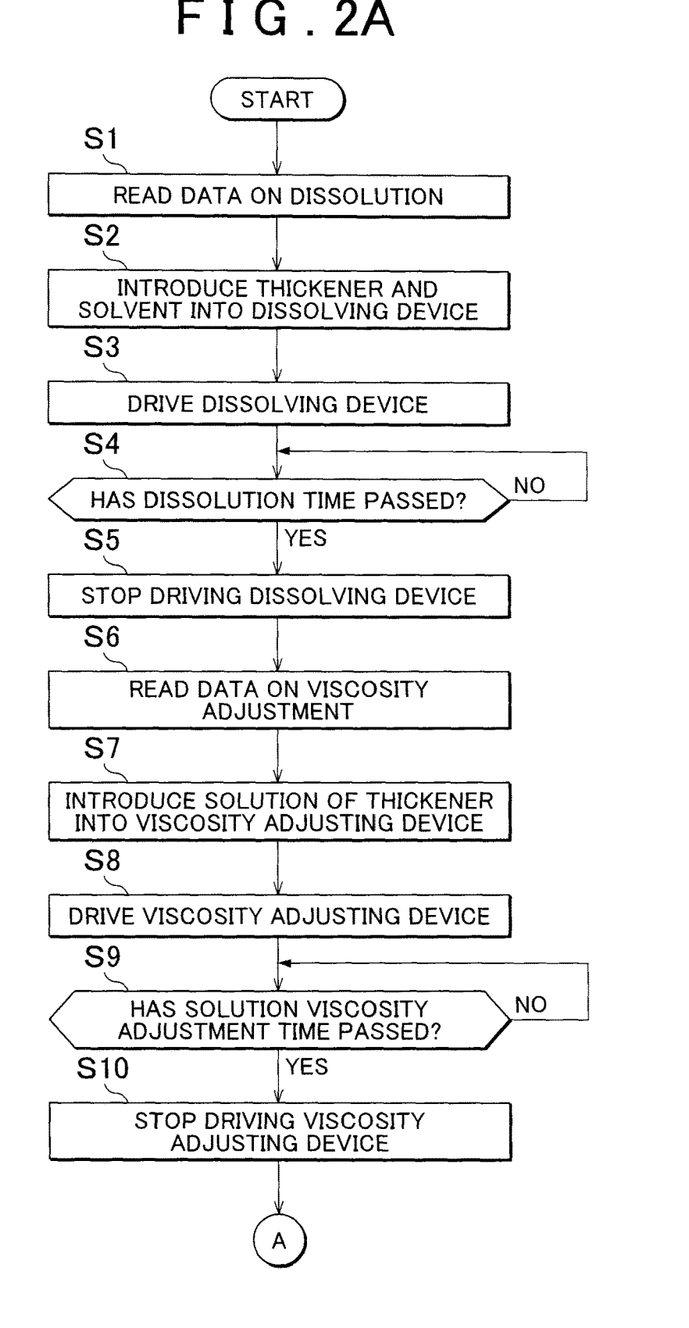
FIG. 2A is a flowchart illustrating processing that is performed by a manufacturing control device of the apparatus for manufacturing an electricity storage material according to the embodiment of the invention.

The manufacturing control device 5 then reads data relating to viscosity adjustment (step S6 in FIG. 2A), and introduces the solution of the thickener into the viscosity adjusting device 3 (step S7 in FIG. 2A). The manufacturing control device 5 drives the viscosity adjusting device 3 (step S8 in FIG. 2A), and determines if a predetermined solution viscosity adjustment time has passed (step S9 in FIG. 2A). If the predetermined solution viscosity adjustment time has passed, the manufacturing control device 5 stops driving the viscosity adjusting device 3 (step S10 in FIG. 2A).

Specifically, the viscosity adjustment control device 53 reads from the memory device 51 data showing the relationship between the viscosity of the slurry of the active material and the viscosity of the solution of the thickener and data showing the relationship between the viscosity of the solution of the thickener and the solution viscosity adjustment time. The viscosity adjustment control device 53 introduces the solution of the thickener contained in the housing 21 of the dissolving device 2 into the housing 31 through the inlet pipe 33. The viscosity adjustment control device 53 drives the ultrasonic device 32 to apply ultrasonic waves to the solution of the thickener in the housing 31. The viscosity adjustment control device 53 stops driving the ultrasonic device 32 if the predetermined solution viscosity adjustment time has passed.

Figure 5:
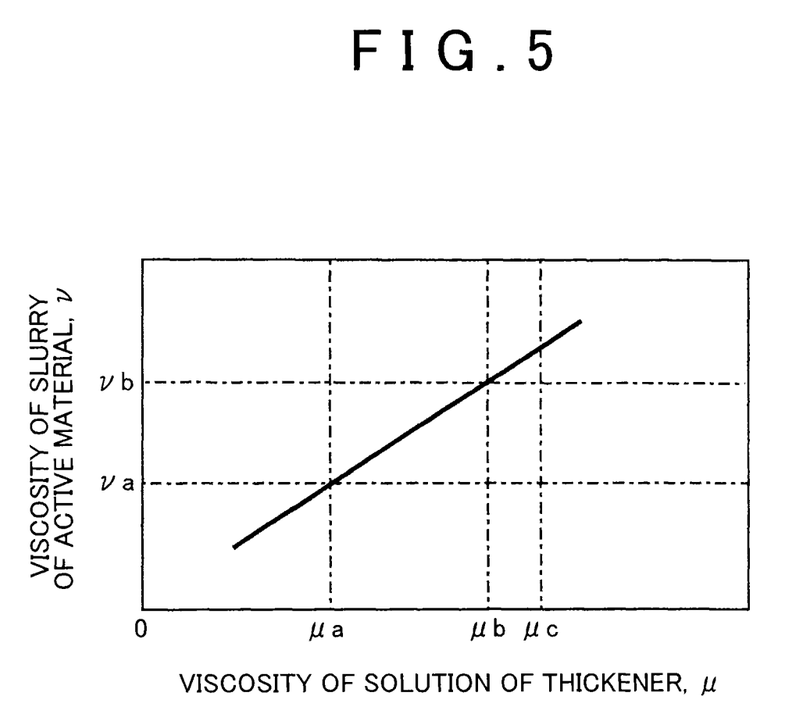
FIG. 5 is a diagram showing the relationship between the final viscosity of slurry of an active material and the viscosity of the solution of the thickener.

Viscosity adjustment of the solution of the thickener will be described. As shown in FIG. 5, the final viscosity v of the slurry of the active material is proportional to the viscosity $\mu$ of the solution of the thickener. The viscosity v of the slurry of the active material can therefore be adjusted to a predetermined range of va to vb by adjusting the viscosity $\mu$ of the solution of the thickener to a predetermined value. The predetermined range of va to vb can be decided based on the balance between the initial battery performance and the time required to perform the steps of applying and drying the slurry.

The viscosity $\mu$ of the solution of the thickener is adjusted to a predetermined viscosity range of $\mu a$ to $\mu b$ shown in FIG. 5, or is adjusted to a value $\mu c$ that is higher than the upper limit $\mu b$ of the predetermined viscosity range by a predetermined value. The viscosity adjustment time required to knead the solution of the thickener and the powder of the active material etc. to obtain the final viscosity of the slurry of the active material can be reduced by adjusting the viscosity $\mu$ of the solution of the thickener to the predetermined viscosity range of $\mu a$ to $\mu b$, which is close to the final viscosity of the slurry of the active material. The time during which the active material is subjected to a shear force is therefore reduced, which can reduce damage to the active material. Even if the viscosity $\mu$ of the solution of the thickener is the value $\mu c$ that is higher than the upper limit $\mu b$ by the predetermined value, the viscosity $\mu$ of the solution of the thickener can be adjusted to the predetermined viscosity range of $\mu a$ to $\mu b$ by adding the solvent afterward.

Figure 6:
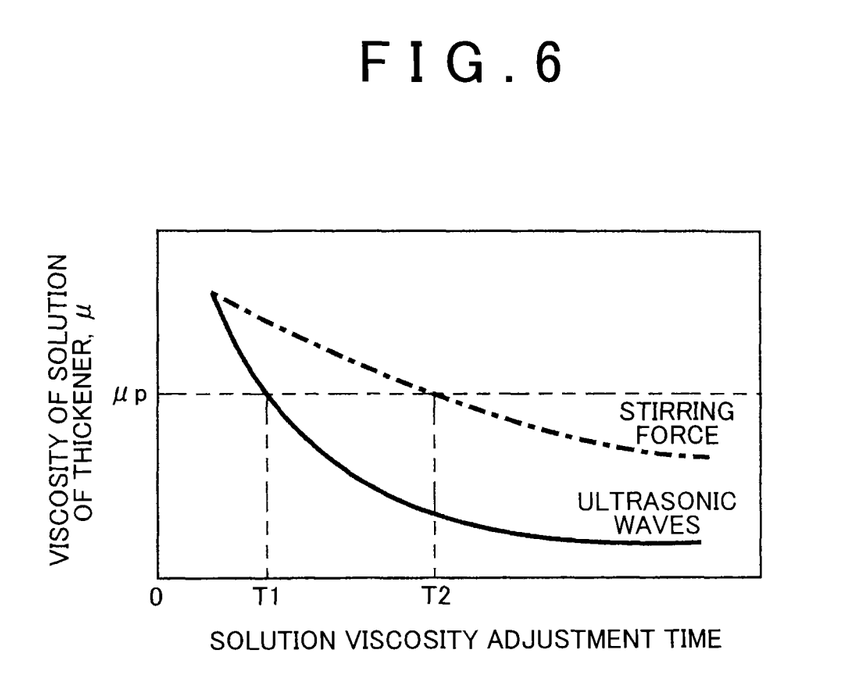
FIG. 6 is a diagram showing respective changes in viscosity of the solution of the thickener with time in the case of performing viscosity adjustment by using ultrasonic waves and a stirring force.

The viscosity adjustment of the solution of the thickener may be performed by cutting the molecular chains of the thickener with shear energy generated by a stirring force as in conventional examples. In the present embodiment, however, the viscosity adjustment is performed by cutting the molecular chains of the thickener with collision energy and shear energy which are generated by ultrasonic waves. This is because the viscosity of the solution of the thickener can be adjusted more quickly and more efficiently by using ultrasonic waves than by using a stirring force, as shown in FIG. 6.

That is, the time required to adjust the viscosity $\mu$ of the solution of the thickener to target viscosity $\mu p$ (the solution viscosity adjustment time) is T2 in the case of using a stirring force. However, the use of ultrasonic waves can reduce the solution viscosity adjustment time to T1 (<T2). The viscosity adjustment using ultrasonic waves therefore requires less electric power than the viscosity adjustment using a stirring force. The viscosity $\mu$ of the solution of the thickener decreases with an increase in solution viscosity adjustment time, and finally becomes the viscosity of water.

Figure 2B:
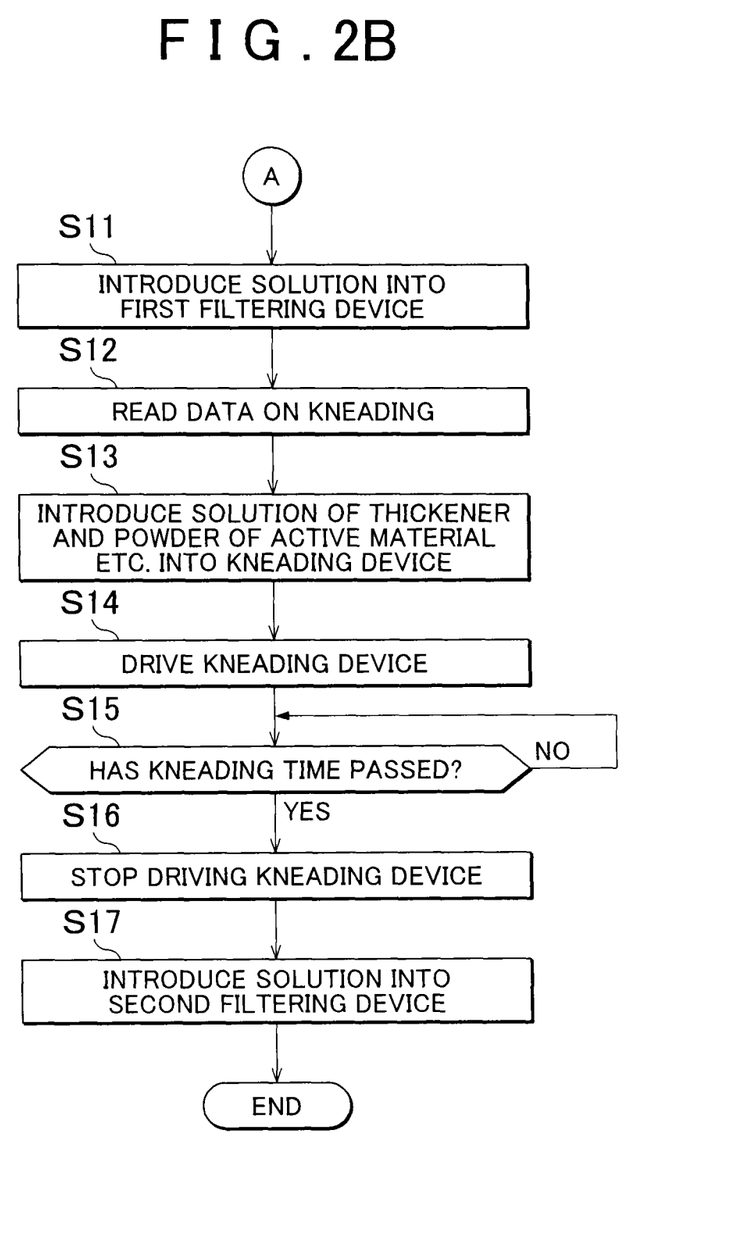
FIG. 2B is a flowchart illustrating processing that is performed by a manufacturing control device of the apparatus for manufacturing an electricity storage material according to the embodiment of the invention.

The manufacturing control device 5 then introduces the solution of the thickener having the adjusted viscosity into the first filtering device 6 through the inlet pipe 45 (step S11 in FIG. 2B). The solution of the thickener having the adjusted viscosity is thus filtered by the filter 61 having the opening equal to the minimum particle size Dmin of the powder of the active material, whereby microgels as coarse particles of the thickener in the solution of the thickener are removed.

Subsequently, the manufacturing control device 5 reads data relating to kneading of the solution of the thickener and the powder of the active material etc. (step S12 in FIG. 2B), and introduces the solution of the thickener and the powder of the active material etc. into the kneading device 4 (step S13 in FIG. 2B). The manufacturing control device 5 drives the kneading device 4 (step S14 in FIG. 2B), and determines if a predetermined kneading time has passed (step S15 in FIG. 2B). If the predetermined kneading time has passed, the manufacturing control device 5 stops driving the kneading device 4 (step S16 in FIG. 2B), and produces final slurry of the active material.

Specifically, the kneading control device 54 reads from the memory device 51 data on the mass of the solution of the thickener and the mass of the powder of the active material etc. and data on the kneading time. The kneading control device 54 introduces a predetermined amount of the powder of the active material etc. into the housing 41 through the hopper 44, and also introduces a predetermined amount of the solution of the thickener into the housing 41 through the inlet pipe 45. The kneading control device 54 drives the drive motor 43 to rotate the stirring blades 42 for the predetermined kneading time.

Figure 8:
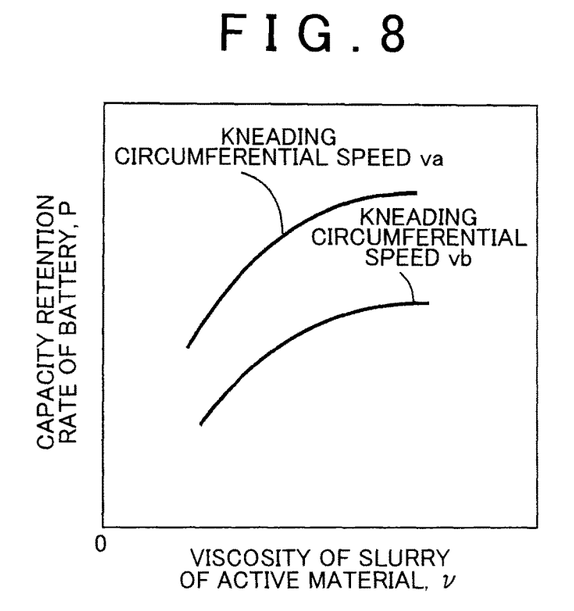
FIG. 8 is a diagram showing the relationship between the capacity retention rate of a battery, i.e., durability (charge-discharge repeating characteristics) of the battery, and the viscosity of the slurry of the active material.

Setting of the kneading index and the kneading conditions will be described. As shown by the experimental result of FIG. 8, the capacity retention rate P of the battery, i.e., durability (charge-discharge repeating characteristics) of the battery, increases as the viscosity v of the slurry of the active material increases. However, increasing the kneading circumferential speed v of the stirring blades 42 of the kneading device 4 (va<vb) reduces the capacity retention rate P of the battery even if the kneading is performed to obtain the same viscosity v of the slurry of the active material. As the kneading circumferential speed v of the stirring blades 42 increases, the particles of the active material collide with the stirring blades 42 more frequently during kneading, and therefore have a higher probability of being damaged. If the particles of the active material are damaged and broken into smaller particles, the overall surface area of the particles is increased, and decomposition of the electrolyte is facilitated. The capacity retention rate P of the battery is thus significantly associated with damage to the particles of the active material.

Factors in the damage to the particles of the active material include the kneading time t for the active material and the solid content rate (solid content/(solid content+ liquid content)) $\eta$ of the active material in addition to the kneading circumferential speed v of the stirring blades 42. Accordingly, the number of collisions of the particles of the active material is obtained based on a known mean free path by using a model of the particles of the active material which move freely in a predetermined space. As given by the following formula (1), cumulative collision energy D of the particles of the active material as the kneading index can be obtained by multiplying the kinetic energy $mv^2/2$ of the particles of the active material, the number of collisions $\sqrt{(2)}\cdot\eta\cdot\sigma\cdot v$ of the particles of the active material, and the kneading time t for the active material. The damage state of the particles of the active material due to kneading can thus be predicted before the kneading process.

$$D = \left(\frac{mv^2}{2}\right) \times \left(\sqrt{2}\,\eta\sigma v\right) \times (t) \quad (1)$$

where "D" represents the cumulative collision energy of the particles of the active material, "m" represents the weight of a single particle of the active material, "v" represents the kneading circumferential speed of the stirring blades, "$\eta$" represents the solid content rate of the active material, "$\sigma$" represents the mean particle size of the particles of the active material, and "t" represents the kneading time for the active material.

Figure 9:
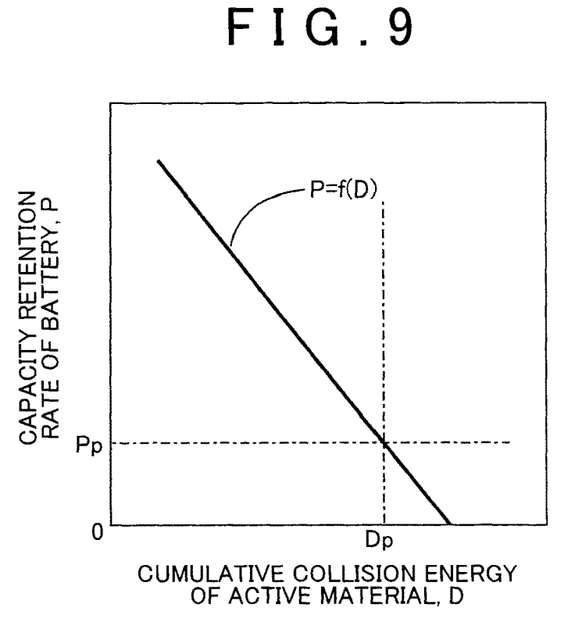
FIG. 9 is a diagram showing the relationship between the capacity retention rate of the battery and the cumulative collision energy of the active material.

The relationship between the capacity retention rate P of the battery and the cumulative collision energy D of the active material is obtained as shown in FIG. 9. This relationship is obtained by adjusting the kneading circumferential speed v of the stirring blades, the solid content rate $\eta$ of the active material, and the kneading time t for the active material which are the factors in the damage to the particles of the active material. The relational expression P=f(D) is obtained, and cumulative collision energy Dp of the active material which corresponds to a minimum required capacity retention rate Pp of the battery is obtained. Kneading conditions are set so that the cumulative collision energy of the active material becomes equal to or lower than Dp. That is, the kneading circumferential speed v of the stirring blades, the solid content rate $\eta$ of the active material, and the kneading time t for the active material are set so that the cumulative collision energy of the active material is equal to or lower than Dp. The solid content rate is adjusted by changing the rate of the solid content to the liquid content.

The number of collisions of the particles of the active material was obtained based on the mean free path of the particles of the active material by using the model of the particles of the active material which move freely in a predetermined space, as described above. The cumulative collision energy of the active material can be obtained by multiplying the number of collisions of the particles of the active material, the kinetic energy of the active material, and the kneading time of the active material, and the cumulative collision energy thus obtained can be used as an index of durability of the battery. Since the damage state of the particles of the active material due to kneading can be predicted before actual kneading, kneading can be performed such that the particles of the active material are less likely to be damaged. A durable battery can therefore be manufactured.

Subsequently, the manufacturing control device 5 introduces the slurry produced by kneading the solution of the thickener and the powder of the active material etc. into the second filtering device 7 through the drain pipe 46 (step S17 in FIG. 2B). The slurry produced by kneading the solution of the thickener and the powder of the active material etc. is thus filtered by the filter 71 having the opening equal to the maximum particle size Dmax of the powder of the active material, whereby aggregates of the powder of the active material, metal foreign matter, dust, etc. are removed. The processing by the manufacturing control device 5 is thus completed.

According to the apparatus 1 for manufacturing an electricity storage material, almost all the microgels as coarse particles of the thickener in the solution of the thickener can be removed by the first filtering device 6. This can prevent defective coating in the coating (application) of the slurry of the active material, whereby satisfactory electrodes can be manufactured. Aggregates of the powder of the active material etc. can be substantially removed by the second filtering device 7, and the non-aggregated powder of the active material etc. is not removed by the second filtering device 7. This can improve yield of the slurry of the active material.

In the above embodiment, the first filtering device 6 uses the filter 61 having the opening equal to the minimum particle size Dmin of the powder of the active material, and the second filtering device 7 uses the filter 71 having the opening equal to the maximum particle size Dmax of the powder pf the active material. However, the following filters 61, 71 may be used.

As described above, the frequency of the particle sizes of microgels in the solution of the thickener has a normal distribution in the range from the diameter D1 slightly smaller than the minimum particle size Dmin of the powder of the active material to the diameter D2 larger than the known maximum particle size Dmax of the powder of the active material. Accordingly, reducing the removal percentage of microgels in the solution of the thickener allows the filter 61 having the opening larger than the minimum particle size Dmin of the power of the active material and smaller than the maximum particle size Dmax of the powder of the active material to be used in the first filtering device 6. In the case of using this filter 61, the filter 71 having the opening larger than that of the filter 61 of the first filtering device 6 is used in the second filtering device 7, whereby the yield of the slurry of the active material is improved. Reducing the removal percentage of the microgels can also increase the production rate of the slurry of the active material and can extend the life of the filters 61, 71.

The above embodiment is described with respect to the apparatus 1 for manufacturing an electricity storage material, which includes the dissolving device 2 having the microwave device 22, and the viscosity adjusting device 3 having the ultrasonic device 32. However, the dissolving device 2 may be replaced with a dissolving device having stirring blades, or the viscosity adjusting device 3 may be replaced with a viscosity adjusting device having stirring blades. The apparatus for manufacturing an electricity storage material according to the invention may perform both dissolution and viscosity adjustment by a single device. The above embodiment is described with respect to the kneading device 4 having the stirring blades 42. However, the kneading device may alternatively have a screw.

The above embodiment is described with respect to the case of manufacturing the active material for negative electrodes of lithium ion secondary batteries. However, the invention may also be applicable to the case of manufacturing an active material for positive electrodes of lithium ion secondary batteries. In this case, microwaves are applied when a binder such as polyvinylidene fluoride is dissolved in a solvent such as N-methylpyrrolidone. However, no ultrasonic waves are applied in the case where a conductive agent such as acetylene black is mixed with the solution in the dissolving step. This is because the viscosity of the solution can be adjusted according to the amount of conductive agent such as acetylene black to be mixed. The electricity storage material to which the invention is applied is not limited to the active material for electrodes of lithium ion secondary batteries. The invention is also applicable to any electricity storage materials such as, e.g., materials for capacitors.

What is claimed is:

1. An apparatus for manufacturing an electricity storage material, comprising:
    a dissolving device comprising:
        a thickener hopper;
        a solvent supply pipe;
        a microwave device; and
        a fluid outlet;

a viscosity adjusting device in fluid communication with the dissolving device through the fluid outlet of the dissolving device, comprising:
  an ultrasonic device; and
  a fluid outlet having a first filtering device comprising an opening; and
a kneading device in fluid communication with the first filtering device, comprising:
  stirring blades with a drive motor;
  an active material hopper comprising an active material having a minimum particle size and a maximum particle size; and
  a drain outlet;
  wherein a mesh size of the opening of the first filter is equal to the minimum particle size of the active material of the active material hopper.

2. The apparatus according to claim 1, wherein the first filtering device allows a material having a size equal to or smaller than a first particle size to pass therethrough, and the first particle size is smaller than a maximum particle size of the active material.

3. The apparatus according to claim 2, wherein the first filtering device allows a material having a size equal to or smaller than the first particle size to pass therethrough, and the first particle size is equal to or smaller than a minimum particle size of the active material.

4. The apparatus according to claim 3, further comprising:
a second filtering device in downstream fluid communication with the drain outlet, wherein
the second filtering device filters a kneaded mixture produced by the kneading device, and allows a material having a size equal to or smaller than a second particle size to pass therethrough, and
the second particle size is larger than a maximum value of the particle size that passes through the first filtering device.

5. The apparatus according to claim 4, wherein the second particle size is equal to or larger than the maximum particle size of the active material.

6. The apparatus according to claim 2, further comprising:
a second filtering device in downstream fluid communication with the drain outlet, wherein
the second filtering device filters a kneaded mixture produced by the kneading device, and allows a material having a size equal to or smaller than a second particle size to pass therethrough, and
the second particle size is larger than a maximum value of the particle size that passes through the first filtering device.

7. The apparatus according to claim 6, wherein the second particle size is equal to or larger than the maximum particle size of the active material.

8. The apparatus according to claim 1, further comprising:
a second filtering device in downstream fluid communication with the drain outlet, wherein
the second filtering device filters a kneaded mixture produced by the kneading device, and allows a material having a size equal to or smaller than a second particle size to pass therethrough, and the second particle size is larger than a maximum value of the particle size that passes through the first filtering device.

9. The apparatus according to claim 8, wherein the second particle size is equal to or larger than the maximum particle size of the active material.

10. A method for manufacturing an electricity storage material in the apparatus according to claim 1, comprising:
  dissolving a thickener in a solvent in the dissolving device;
  adjusting the viscosity of the solution produced by dissolution of the thickener in the solvent;
  performing a first filtering of the solution having the viscosity adjusted by the viscosity adjustment in the first filtering device; and
  kneading the solution filtered by the first filtering and an active material in the kneading device, wherein
  the method is applied to manufacturing of an electricity storage material containing at least the thickener and the active material.

* * * * *